(No Model.)
H. N. DAVIS.
VEHICLE BRAKE.
No. 550,872.  Patented Dec. 3, 1895.
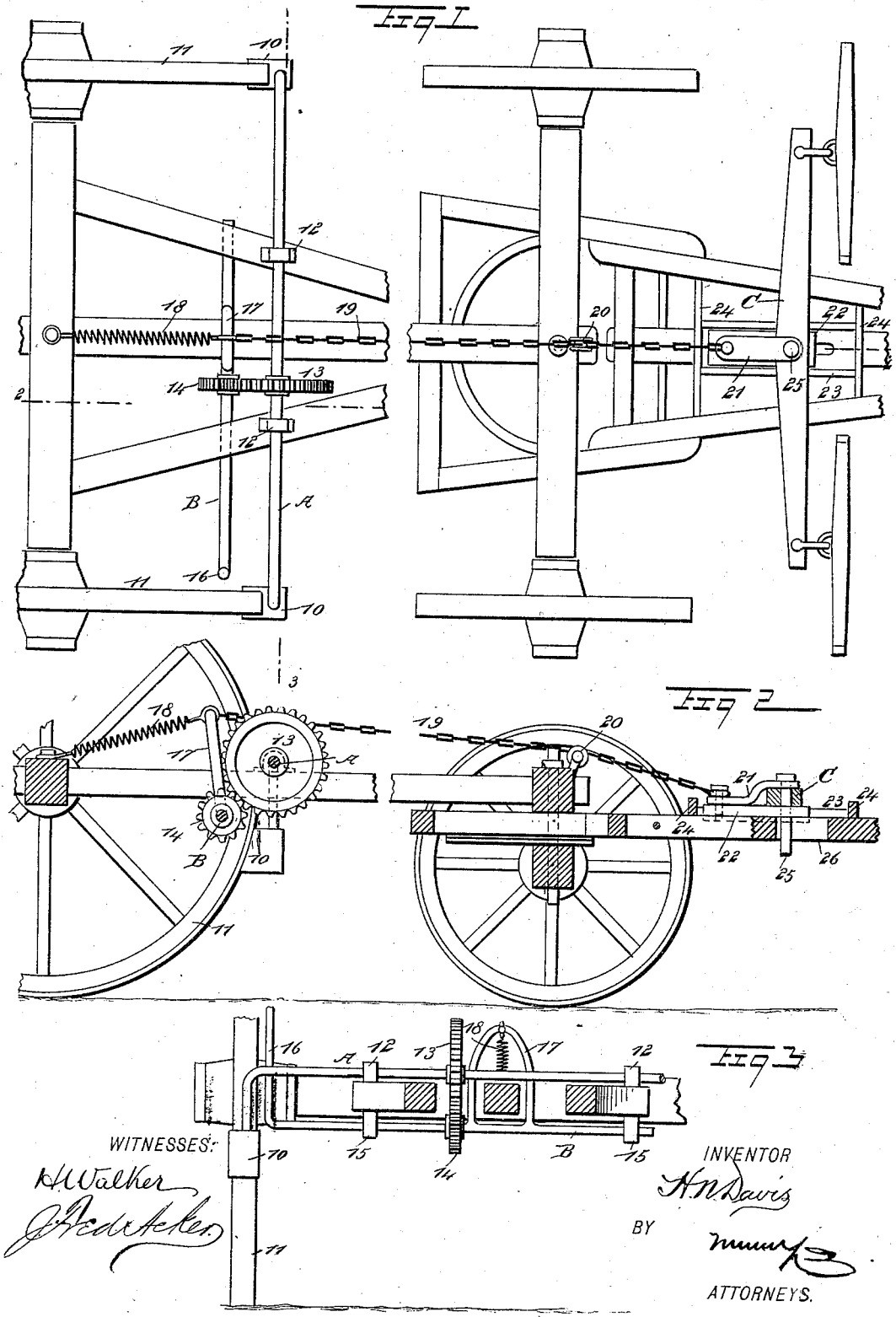
WITNESSES:
H. Walker
J. H. de Acker
INVENTOR
H. N. Davis
BY
[signature]
ATTORNEYS.

UNITED STATES PATENT OFFICE.

HENRY N. DAVIS, OF DOW CITY, IOWA.

VEHICLE-BRAKE.

SPECIFICATION forming part of Letters Patent No. 550,872, dated December 3, 1895.

Application filed June 1, 1895. Serial No. 551,372. (No model.)

*To all whom it may concern:*

Be it known that I, HENRY N. DAVIS, of Dow City, in the county of Crawford and State of Iowa, have invented a new and useful Improvement in Vehicle-Brakes, of which the following is a full, clear, and exact description.

My invention relates to an improvement in vehicle-brakes; and the object of the invention is to provide a brake adapted for use in connection with any form of vehicle, which when the vehicle is at rest will be applied to the wheels and which when the vehicle is traveling will be automatically removed from the wheels.

A further object of the invention is to construct a brake operating automatically, as above set forth, the mechanism being exceedingly simple, durable, economical, and readily applied.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a portion of the running-gear of a wagon, illustrating the application of the improved brake thereto. Fig. 2 is a longitudinal section taken substantially on the line 2 2 of Fig. 1, and Fig. 3 is a transverse section taken practically on the line 3 3 of Fig. 1.

In carrying out the invention the brake-shaft A is provided with any desired form of brake-shoe 10 at each end adapted for engagement with the rear wheels 11 of the vehicle. When the brake is applied to the running-gear of a wagon, the brake-shaft may be and preferably is journaled in bearings 12, which are located upon the rear hounds, as shown in Fig. 1.

At or near the center of the brake-shaft a gear-wheel 13 is firmly secured, which meshes with a pinion 14, secured on a rock-shaft B, and this rock-shaft is usually journaled in bearings 15, located upon the under face of the rear hounds, as shown in Fig. 3. The shaft is provided at one or both of its ends with a handle 16, in order that it may be manipulated by hand when necessary, and the rock-shaft B is further provided with a yoke or loop 17, through which the reach is made to pass, the yoke extending above the said reach, and the yoke is normally drawn to the rearward position (shown in Fig. 2) by means of a spring 18, attached to the upper portion of the yoke and to the rear axle or other suitable support forming a portion of the running-gear. When the spring 18 is exerting tension on the yoke, the rock-shaft to which the yoke is attached will have been turned in a direction to cause the pinion to act on the gear 13 in such a manner as to apply the brakes to the wheels 11 and maintain the brakes under such application.

The brakes are to be removed from engagement with the wheels the moment that the team starts to draw the vehicle, and to that end a chain or cable 19 is secured to the forward portion of the yoke of the rock-shaft, being carried forward over a suitable guide-roller 20 to an attachment to a clevis or bracket 21, pivotally connected with the doubletree C, the said bracket or clevis being preferably secured to a block 22, which extends under the doubletree and is held to slide between side guides 23, constructed upon the tongue of the vehicle or upon the forward end of the reach, and the forward and rearward movement of the block 22 is limited by forward and rear stops 24.

The pin 25, which pivots the doubletree upon the clevis or bracket, is made to pass downward through and is held to slide in a longitudinal slot 26, made in the said pole or reach. Therefore when the horses draw forward the chain or cable 19 is carried in the same direction and the rock-shaft B, through the medium of its pinion, will rotate the gear in a direction to carry the brakes from engagement with the wheels, and the brakes will remain thus out of engagement while the team is drawing the vehicle; but the moment that the team is brought to a standstill the spring 18 will act to restore the brake-shoes to their normal or braking position.

It will be understood that elliptical or segmental gearing may be used instead of the ordinary gear, if necessary.

Tension upon the spring 18 may be increased or diminished in any desired way— as, for example, by passing a bolt through the spring having a head at one end and a nut at the other end, the spring being between these points.

Having thus described my invention, I claim as new and desire to secure by Letters Patent—

1. In a vehicle brake, the combination, with a brake shaft and its brake shoes, and a gear secured to the said brake shaft, of a rock shaft provided with a crank arm at a point in its length, a tension device secured to the said crank arm and to a fixed support, a pinion carried by the rock shaft and meshing with the gear of the brake shaft, a single or doubletree capable of forward and rearward movement, and a connection between the crank arm of the rock shaft and the said single or doubletree, as and for the purpose specified.

2. In a vehicle brake, the combination, with the running gear, a brake shaft journaled upon the said running gear and provided with brake shoes, and a single or doubletree having sliding and guided movement on the running gear, of a rock shaft provided with a crank arm, a pinion secured to the rock shaft and engaging with the gear of the brake shaft, a spring attached to the crank arm of the rock shaft and exerting tension thereon in a rearwardly direction, whereby the brake shoes are normally applied to the wheels of the vehicle, and a chain or cable connection between the single or doubletree and the crank arm of the rock shaft, whereby when power is applied to move the vehicle the rock shaft will be moved forwardly and the brake shoes will be released from the wheels, as and for the purpose specified.

HENRY N. DAVIS.

Witnesses:
H. O. SMITH,
H. C. McCUSKEY.